(12) United States Patent
DiMaio et al.

(10) Patent No.: US 7,037,974 B2
(45) Date of Patent: May 2, 2006

(54) PROCESS FOR THE OLIGOMERIZATION OF α-OLEFINS HAVING LOW UNSATURATION, THE RESULTING POLYMERS, AND LUBRICANTS CONTAINING SAME

(75) Inventors: Anthony DiMaio, Woodbury, CT (US); Thomas P. Matan, Naugatuck, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 10/771,780

(22) Filed: Feb. 4, 2004

(65) Prior Publication Data

US 2004/0157752 A1    Aug. 12, 2004

Related U.S. Application Data

(62) Division of application No. 10/014,911, filed on Dec. 14, 2001, now Pat. No. 6,713,582.

(51) Int. Cl.
   C08L 23/18    (2006.01)
   C08L 5/01     (2006.01)
   C08F 232/00   (2006.01)

(52) U.S. Cl. .................. 524/579; 524/490; 526/348; 526/281; 526/280; 526/308

(58) Field of Classification Search ........... 524/579, 524/474; 526/281, 308, 348.3, 280
   See application file for complete search history.

(56) References Cited

U.S. PATENT DOCUMENTS

| 5,087,677 | A |   | 2/1992  | Brekner et al. ........... 526/160 |
|-----------|---|---|---------|-----------------------------------|
| 5,324,801 | A |   | 6/1994  | Brekner et al. ........... 526/160 |
| 5,359,001 | A |   | 10/1994 | Epple et al. ............. 525/97  |
| 5,371,158 | A |   | 12/1994 | Brekner et al. ........... 526/127 |
| 5,629,398 | A | * | 5/1997  | Okamoto et al. .......... 526/281  |
| 5,635,573 | A |   | 6/1997  | Harrington et al. ........ 526/170 |
| 5,677,405 | A |   | 10/1997 | Goodall et al. ........... 526/281 |
| 5,981,643 | A | * | 11/1999 | Datta et al. ............. 524/491  |
| 5,990,254 | A |   | 11/1999 | Weller et al. ............ 526/160  |

FOREIGN PATENT DOCUMENTS

| EP | 0693568 A1 | 1/1996  |
|----|------------|---------|
| EP | 0694567 A2 | 1/1996  |
| EP | 0407870 B1 | 12/1997 |
| EP | 0485893 B1 | 4/1998  |
| EP | 0503422 B1 | 6/1998  |
| EP | 0501370 B1 | 11/1998 |
| EP | 0683797 B1 | 4/1999  |
| EP | 0661308 B1 | 6/1999  |
| EP | 0661310 B1 | 7/1999  |
| WO | 99/67347   | 12/1999 |

OTHER PUBLICATIONS

Kaminsky et al., Studies in Surface Science and Catalysts, 1989, Polymerization of Cyclic Olefins with Homogeneous Catalysts, pp. 425-438.
Kaminsky et al., Makromol. Chem., Macromol. Symp 47, 83-93 (1991).
Kaminsky, Polymerization and Copolymerization of Olefins with Metallocene/Aluminoxand Catalysts, vol. 33, No. 8, 1991, pp. 536-544.
Kaminsky et al, Stereospecific Polymerization by Metallocene/Aluminoxane Catalysts, Journal of Molecular Catalysis, 74 (1992) 109-119.
Cherdron et al., Cycloolefin-Copolymere: Eine neue Klasse transparenter Thermoplaste, Die Angewandte Makromolekulare Chemie 223 (1994), 121-133 (4011).
Janiak et al., Metal Catalylsts for the Vinyl Polymerization of Norbornene, Journal of Molecular Catalysis A: Chemical 166 (2001) 193-209.
Kaminsky et al., A Tailor-Made Metallocene for the Copolymerization of Ethene with Bulky Cycloalkenes, Angew. Chem. Int. Ed. Engl. 1995, 34, No. 20, pps. 2273-2275.
Janiak et al., The Vinyl Homopolymerization of Norbornene, Macromol. Rapid Commun. 2001, 22, 479-492.
Brintzinger et al., Stereospecific Olefin Polymerization with chiral Metallocene Catalysts, Angew. Chem. Int. Ed. Engl. 1995, 34, 1143-1170.
Kaminsky, New Polymers by Metallocene Catalysis, Macromol. Chem. Phys. 197, 3907-3945 (1996).

(Continued)

Primary Examiner—David W. Wu
Assistant Examiner—Rip A. Lee
(74) Attorney, Agent, or Firm—Michael P. Dilworth

(57) ABSTRACT

A poly(α-olefin) copolymer obtained from the polymerization of at least one α-olefin having from 2 to about 20 carbon atoms and at least one bulky olefin, the process comprising polymerizing the monomers in the presence of hydrogen and a catalytically effective amount of a catalyst comprising the product obtained by combining a metallocene procatalyst with a cocatalyst; lubricant compositions comprising such poly(α-olefin) copolymer; and a method for improving the viscosity index of a lubricant composition using such poly (α-olefin) copolymer.

6 Claims, No Drawings

OTHER PUBLICATIONS

Kaminsky et al., Homo-and Copolymerization of Cycloolefins by Metallocene Catalysts, Metallocene-based Polyolefins, vol. 2, 2000, pp. 91-113.

Ruchatz et al., Ethene-Norbornene Copolymerization, Macromolecules, vol. 31, No. 15, 1998, pp. 4669-4673.

Ruchatz et al. Ethene-Norbornene Copolymerization, Marcromolecules 1998, 31, 4674-4680.

Ruchatz et al., Ethene-Norbornene Copolymerization, Marcromolecules 1998, 31, 4681-4683.

Ruchatz et al., Ethene-Norbornene Copolymerization, Macromolecules 1998, 31, 4684-4686.

McKnight et al., Ethylene/Norbornene Copolymerizations with Titanium CpA Catalysts, Macromolecules 1999, 31, 2816-2825.

Arndt-Rosenau et al., Microstructure of Ethene/Norbornene Copolymers, Macromolecules, vol. 32, 22, 7335-7343.

Grassi et al., Synthesis of Ethylene-co-Norbornene Polymers Promoted by MAO Free Catalysts Based on Group 4 Dicarbollide Complexes, Macromol. Chem. Phys. 2001, 1239-1245.

Peucker et al., Vinylic Polymerization and Copolymerization of Norbornene and Ethene by Homogeneous Chromiun (III) Catalysts, Macromol. Chem. Phys. 2001, 202, 1289-1297.

* cited by examiner

PROCESS FOR THE OLIGOMERIZATION OF α-OLEFINS HAVING LOW UNSATURATION, THE RESULTING POLYMERS, AND LUBRICANTS CONTAINING SAME

This application is a division of U.S. patent application Ser. No. 10/014,911 now U.S. Pat. No. 6,713,582, filed on Dec. 14, 2001.

FIELD OF THE INVENTION

This invention relates to a process for producing polymers of α-olefins, e.g., 1-hexene, 1-octene, 1-decene, 1-dodecene, and the like, comprising a minor amount of a bulky olefinic comonomer, e.g., norbornylene, vinyl cyclohexane, and the like, in the presence of a metallocene catalyst. The invention also relates to the resulting polymers and to lubricant compositions in which the polymer functions as a viscosity modifier.

DESCRIPTION OF THE RELATED ART

Catalytic oligomerization of olefins is a known technique for manufacturing hydrocarbon basestocks useful as lubricants. Efforts to improve upon the performance of natural mineral oil based lubricants by the synthesis of oligomeric hydrocarbon fluids have been the subject of important research and development in the petroleum industry for several decades, leading to recent commercial production of a number of superior poly(α-olefin) synthetic lubricants (hereinafter referred to as "PAO"). These materials are primarily based on the oligomerization of α-olefins, such as $C_2$–$C_{20}$ olefins. Industrial research effort on synthetic lubricants has generally focused on fluids exhibiting useful viscosities over a wide range of temperature, i.e., improved viscosity index (VI), while also showing lubricity, thermal, and oxidative stability and pour point equal to or better than mineral oil. These newer synthetic lubricants provide lower friction and hence increase mechanical efficiency across the full spectrum of mechanical loads and do so over a wider range of operating conditions than mineral oil lubricants.

Well known structural and physical property relationships for high polymers as contained in the various disciplines of polymer chemistry have pointed the way to α-olefins as a fruitful field of investigation for the synthesis of oligomers with the structure thought to be needed to confer improved lubricant properties thereon. Owing largely to studies on the polymerization of propene and vinyl monomers, the mechanism of the polymerization of α-olefins and the effect of that mechanism on polymer structure is reasonably well understood, providing a strong resource for targeting on potentially useful oligomerization methods and oligomer structures. Building on that resource, oligomers of α-olefins from 2 to 20 carbon atoms have been prepared with commercially useful synthetic lubricants from, e.g., 1-decene oligomerization.

A significant problem in the manufacture of synthetic lubricants is the production of lubricants in a preferred viscosity range in good yield without excessive catalyst deactivation. Frequently, it is difficult to directly produce lower viscosity range lubes without incurring lower yields due to the production of non-lubricant range materials. Methods to control molecular weight of lubricants in the oligomerization step are sought after in the art to overcome the problems in the manufacture of, particularly, lower viscosity lubricants.

Janiak, C. et al., *Journal of Molecular Catalysis A: Chemical*, 166:193–201 (2001) provide a full literature and patent account of work describing the vinyl polymerization to homo-polynorbornene. The interest in vinyl homo-polynorbornene is driven by its dielectric and mechanical properties for the technical application as an interlevel dielectric in microelectronics applications. The norbornene/olefin copolymerization is covered to some extent for comparison. the metal catalysts are presented and important polymer product properties are emphasized.

U.S. patent application Ser. No. 09/637,791, filed Aug. 11, 2000, discloses a liquid polyalphaolefin homo- or copolymer, preferably 1-decene, which is substantially amorphous and obtained by a polymerization process employing hydrogen and a particular type of metallocene catalyst. Additionally, a liquid polyalphaolefin homo- or copolymer containing from 2 to about 12 carbon atoms possess a unique combination of properties, i.e., low molecular weight ($M_w$), low polydispersity index ($M_w/M_n$), controllable kinematic viscosity ($Kv_{100}$), low Iodine Number ($I_2$) and low glass transition temperature ($T_g$) and are substantially amorphous. These liquid polyalphaolefin homo- or copolymers are useful for manufacturing a variety of products including lubricating oils in which the polyalphaolefin functions as a viscosity modifier.

SUMMARY OF THE INVENTION

The present invention is directed to a process for polymerizing (α-olefins, such as (but not limited to) 1-hexene, 1-octene, 1-decene, and 1-dodecene, to form low molecular weight oligomers and polymers having viscosities suitable for synthetic lubricant applications wherein the process does not require the use of a secondary hydrogenation step to achieve a saturated polymer. The polymerization is carried out in the presence of minor amounts of a bulky olefinic comonomer, such as norbornene (preferred), vinyl cyclohexane, and the like, so that viscosities as low as 20 cSt can be achieved while containing levels of unsaturation (as measured by iodine number determination) at the limits of the test method.

The monomers are polymerized in the presence of a Kaminsky-type "metallocene" catalyst, which provides for stereochemical control during polymerization. Examples of suitable catalysts include, but not limited to, rac-Et(Ind)$_2$ZrCl$_2$, rac-Et(IndH$_4$)$_2$ZrCl$_2$, rac-Me$_2$Si(Ind)$_2$ZrCl$_2$, rac-Me$_2$Si(IndH$_4$)$_2$ZrCl$_2$, Me$_2$Si(Cp-9-Flu)ZrCl$_2$, Me$_2$C(Cp-9-Flu)ZrCl$_2$, and especially (C$_6$H$_5$)$_2$C(Cp-9-Flu)ZrCl$_2$. These catalysts are commonly used in the polymerization of alpha-olefins in conjunction with an alkylaluminum activator, such as methylaluminoxane (MAO), and, possibly, an organoboron activator.

The poly(α-olefin)(PAO) obtained possesses excellent clarity, substantially improved viscosity index, and low temperature properties. By inclusion of both a bulky olefinic comonomer and hydrogen into the polymerization, unsaturation levels are further improved over the inclusion of hydrogen alone in metallocene polymerization, and the need for subsequent hydrogenation of the PAO to remove unsaturation is virtually eliminated.

The PAO formed by this process affords an iodine number of 3 or less for the viscosity range of 40–100 cSt, which is currently commercially available via a different process that involves hydrogenation. This represents both a saving of time and a reduction in production costs from the established production of commercial PAO.

More particularly, the present invention is directed to a process for the preparation of a poly(α-olefin) copolymer comprising polymerizing at least one α-olefin and at least one bulky olefin in the presence of hydrogen and a catalytically effective amount of catalyst comprising the product obtained by combining a metallocene procatalyst with a cocatalyst, the metallocene procatalyst being at least one compound of general formula:

$$(Cp^1R^1{}_m)R^3(Cp^2R^2{}_p)MX_q$$

wherein $Cp^1$ of ligand $(Cp^1R^1{}_m)$ and $Cp^2$ of ligand $(Cp^2R^2{}_p)$ are the same or different cyclopentadienyl rings, $R^1$ and $R^2$ each is, independently, hydrogen or a hydrocarbyl, halocarbyl, heterocarbyl, hydrocarbyl-substituted organometalloid or halocarbyl-substituted organometalloid group containing up to about 20 carbon atoms, m is 0 to 5, p is 0 to 5 and two $R^1$ and/or $R^2$ substituents on adjacent carbon atoms of the cyclopentadienyl ring associated therewith can be joined together to form a ring containing from 4 to about 20 carbon atoms, $R^3$ is a bridging group bridging $Cp^1$ with $Cp^2$, M is a transition metal having a valence of from 3 to 6, each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and q is equal to the valence of M minus 2, the cocatalyst being an aluminoxane and it being provided that ligand $(Cp^1R^1{}_m)$ is different than ligand $(Cp^2R^2{}_p)$ and bridging group $R^3$ contains at least two bulky groups.

In another aspect, the present invention is directed to a poly(α-olefin) copolymer obtained from the polymerization of at least one α-olefin having from 2 to about 20 carbon atoms and at least one bulky olefin, the process comprising polymerizing the monomers in the presence of hydrogen and a catalytically effective amount of a catalyst comprising the product obtained by combining a metallocene procatalyst with a cocatalyst, the metallocene procatalyst being at least one compound of general formula:

$$(Cp^1R^1{}_m)R^3(Cp^2R^2{}_p)MX_q$$

wherein $Cp^1$ of ligand $(Cp^1R^1{}_m)$ and $Cp^2$ of ligand $(Cp^2R^2{}_p)$ are the same or different cyclopentadienyl rings, $R^1$ and $R^2$ each is, independently, hydrogen or a hydrocarbyl, halocarbyl, hydrocarbyl-substituted organometalloid or halocarbyl-substituted organometalloid group containing up to about 20 carbon atoms, m is 0 to 5, p is 0 to 5 and two $R^1$ and/or $R^2$ substituents on adjacent carbon atoims of the cyclopentadienyl ring associated therewith can be joined together to form a ring fused to the cyclopentadienyl ring, the fused ring containing from 4 to about 20 carbon atoms, $R^3$ is a bridging group bridging $Cp^1$ and $Cp^2$, M is a transition metal having a valence of from 3 to 6, each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2, the cocatalyst being an aluminoxane and it being provided that ligand $(Cp^1R^1{}_m)$ is different from ligand $(Cp^2R^2{}_p)$ and bridging group $R^3$ contains at least two bulky groups.

In still another aspect, the present invention is directed to a lubricant composition comprising a lubricant and a viscosity-modifying amount of a poly(α-olefin) copolymer obtained from the polymerization of at least one α-olefin having from 2 to about 20 carbon atoms and at least one bulky olefin, the process comprising polymerizing the monomers in the presence of hydrogen and a catalytically effective amount of a catalyst comprising the product obtained by combining a metallocene procatalyst with a cocatalyst, the metallocene procatalyst being at least one compound of general formula:

$$(Cp^1R^1{}_m)R^3(Cp^2R^2{}_p)MX_q$$

wherein $Cp^1$ of ligand $(Cp^1R^1{}_m)$ and $Cp^2$ of ligand $(Cp^2R^2{}_p)$ are the same or different cyclopentadienyl rings, $R^1$ and $R^2$ each is, independently, hydrogen or a hydrocarbyl, halocarbyl, hydrocarbyl-substituted organometalloid or halocarbyl-substituted organometalloid group containing up to about 20 carbon atoms, m is 0 to 5, p is 0 to 5 and two $R^1$ and/or $R^2$ substituents on adjacent carbon atoms of the cyclopentadienyl ring associated therewith can be joined together to form a ring fused to the cyclopentadienyl ring, the fused ring containing from 4 to about 20 carbon atoms, $R^3$ is a bridging group bridging $Cp^1$ and $Cp^2$, M is a transition metal having a valence of from 3 to, 6, each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2, the cocatalyst being an aluminoxane and it being provided that ligand $(Cp^1R^1{}_m)$ is different from ligand $(Cp^2R^2{}_p)$ and bridging group $R^3$ contains at least two bulky groups.

In yet another aspect, the present invention is directed to a method for improving the viscosity index of a lubricant composition comprising adding to the composition a viscosity-modifying amount of a poly(α-olefin) copolymer obtained from the polymerization of at least one α-olefin having from 2 to about 20 carbon atoms and at least one bulky olefin, the process comprising polymerizing the monomers in the presence of hydrogen and a catalytically effective amount of a catalyst comprising the product obtained by combining a metallocene procatalyst with a cocatalyst, the metallocene procatalyst being at least one compound of general formula:

$$(Cp^1R^1{}_m)R^3(Cp^2R^2{}_p)MX_q$$

wherein $Cp^1$ of ligand $(Cp^1R^1{}_m)$ and $Cp^2$ of ligand $(Cp^2R^2{}_p)$ are the same or different cyclopentadienyl rings, $R^1$ and $R^2$ each is, independently, hydrogen or a hydrocarbyl, halocarbyl, hydrocarbyl-substituted organometalloid or halocarbyl-substituted organometalloid group containing up to about 20 carbon atoms, m is 0 to 5, p is 0 to 5 and two $R^1$ and/or $R^2$ substituents on adjacent carbon atoms of the cyclopentadienyl ring associated therewith can be joined together to form a ring fused to the cyclopentadienyl ring, the fused ring containing from 4 to about 20 carbon atoms, $R^3$ is a bridging group bridging $Cp^1$ and $Cp^2$, M is a transition metal having a valence of from 3 to 6, each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2, the cocatalyst being an aluminoxane and it being provided that ligand $(Cp^1R^1{}_m)$ is different from ligand $(Cp^2R^2{}_p)$ and bridging group $R^3$ contains at least two bulky groups.

DESCRIPTION OF THE PREFERRED EMBODIMENTS

The poly(α-olefin) polymers of this invention are substantially saturated, i.e., one possessing a low iodine number, which is discussed hereinbelow, and can be obtained by copolymerizing at least one α-olefin monomer, e.g., 1-decene, with at least one bulky olefin, e.g., norbornene, in the presence of a catalyst composition formed by activating a metallocene procatalyst with a suitable cocatalyst. Preferably, hydrogen will also be present in the polymerization.

The α-olefins suitable for use in the preparation of the saturated poly(α-olefin) polymers described herein contain from 2 to about 20 carbon atoms, preferably from about 6 to about 16 carbon atoms. Suitable α-olefins include, but are not limited to, ethylene, propylene, 2-methylpropene, 1-butene, 3-methyl-1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and the like. Preferred α-olefins for use herein are 1-hexene, 1-octene, 1-decene, and 1-dodecene, with 1-decene being most preferred.

The poly(α-olefin) copolymers of the present invention comprise greater than fifty mole percent of polymerized α-olefin and less than fifty mole percent, but greater than zero mole percent, of the bulky olefinic comonomer. Preferably, the copolymers can contain up to about 99.9, more preferably from about 90 to about 99.7, and most preferably from about 93 to about 99.6, mole percent polymerized α-olefin, e.g., polymerized 1-decene.

The "bulky olefin" comonomers that can be used in the practice of the invention are generally norbornenes or cyclomonolefins that are typically formed by the Diels-Alder reaction of cyclopentadiene and an olefin, e.g., norbornene, 5-methyl-2-norbornene, 5-ethyl-2-norbornene, and the like. The cyclic and polycyclic olefins disclosed in U.S. Pat. No. 5,324,801, hereby incorporated herein by reference in its entirety, can also be used. Specifically, such cyclic and polycyclic olefins include those of the structural formulae:

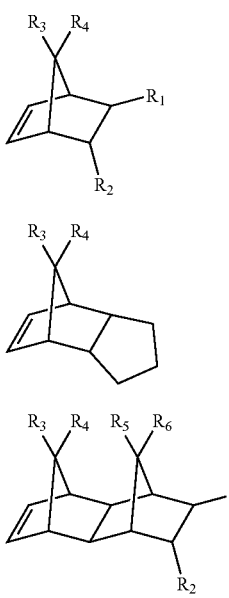

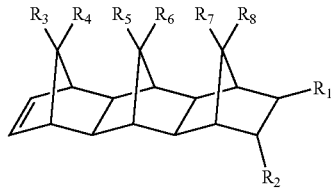

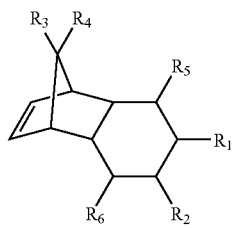

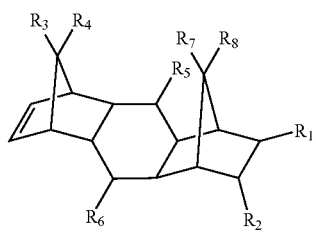

wherein $R_1$, $R_2$, $R_3$, $R_4$, $R_5$, $R_6$, $R_7$, and $R_8$ are identical or different and are selected from the group consisting of hydrogen, $C_6$–$C_{16}$ aryl moieties, and $C_1$–$C_8$ alkyl moieties, it being possible for identical radicals in the different formulae to have different meanings.

The catalyst composition for use herein is formed by activating a metallocene procatalyst with a suitable catalyst. The terms "metallocene" and "metallocene procatalyst" as used herein shall be understood to refer to compounds possessing a transition metal M, at least one non-cyclopentadienyl-derived ligand X and zero or one heteroatom-containing ligand Y, the ligand being coordinated to M and corresponding in number to the valence thereof. Such compounds, cocatalysts useful for their activation to provide metallocene catalysts that may be employed for the polymerization of olefins to provide polyolefin homopolymers and copolymers, and/or polymerization processes employing one or more of the metallocene catalysts are described in, among others, U.S. Pat. Nos. 4,752,597; 4,892,851; 4,931,417; 4,931,517; 4,933,403; 5,001,205; 5,017,714; 5,026,798; 5,034,549; 5,036,034; 5,055,438; 5,064,802; 5,086,134; 5,087,677; 5,126,301; 5,126,303; 5,132,262; 5,132,380; 5,132,381; 5,145,819; 5,153,157; 5,155,080; 5,225,501; 5,227,478; 5,241,025; 5,243,002; 5,278,119; 5,278,265; 5,281,679; 5,296,434; 5,304,614; 5,308,817; 5,324,800; 5,328,969; 5,329,031; 5,330,948; 5,331,057; 5,349,032; 5,372,980; 5,374,753; 5,385,877; 5,391,629; 5,391,789; 5,399,636; 5,401,817; 5,406,013; 5,416,177; 5,416,178; 5,416,228; 5,427,991; 5,439,994; 5,441,920; 5,442,020; 5,449,651; 5,453,410; 5,455,365; 5,455,366; 5,459,117; 5,466,649; 5,470,811; 5,470,927; 5,477,895; 5,491,205; and, 5,491,207, the contents of which are incorporated by reference herein.

The metallocene procatalyst is preferably one or a mixture of metallocene compounds of the following general formula:

$$(Cp^1R^1{}_m)R^3(Cp^2R^2{}_p)MX_q$$

wherein:
Cp$^1$ of ligand (Cp$^1$R$^1_m$) and Cp$^2$ of ligand (Cp$^2$R$^2_p$) are the same or different cyclopentadienyl rings;
R$^1$ and R$^2$ are independently selected from the group consisting of hydrogen, hydrocarbyl, halocarbyl, heterocarbyl, hydrocarbyl-substituted organometalloid, and halocarbyl-substituted organometalloid moieties, wherein, in each case, the carbyl moiety contains up to about 20 carbon atoms;
m is 0 to 5;
p is 0 to 5;
two R$^1$ and/or R$^2$ substituents on adjacent carbon atoms of the cyclopentadienyl ring associated therewith can be joined together to form a ring fused to the cyclopentadienyl ring, the fused ring containing from 4 to about 20 carbon atoms;
R$^3$ is a bridging group bridging Cp$^1$ and Cp$^2$;
M is a transition metal having a valence of from 3 to 6;
each X is a non-cyclopentadienyl ligand and is independently selected from the group consisting of halogen, hydrocarbyl, oxyhydrocarbyl, halocarbyl, hydrocarbyl-substituted organometalloid, oxyhydrocarbyl-substituted organometalloid, and halocarbyl-substituted organometalloid moieties, wherein, in each case, the carbyl moiety contains up to about 20 carbon atoms; and
q is equal to the valence of M minus 2.

Methods for preparing these and other useful metallocene procatalysts are known in the art and do not constitute a part of the present invention.

When employing the foregoing metallocene procatalyst, and where the cocatalyst is entirely an aluminoxane, the ligand (Cp$^1$R$^1_m$) must be different from the ligand (Cp$^2$R$^2_p$), and the bridging group R$^3$ must contain at least two bulky groups. Of these bridged metallocenes, it is preferred that bridging group R$^3$ possess the structure

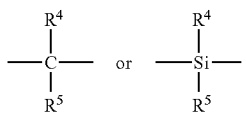

in which bulky groups R$^4$ and R$^5$ each, independently, is, or contains, a cyclohydrocarbyl group containing up to about 20, and preferably from 6 to about 12, carbon atoms and from 0 to 3 heteroatoms, such as oxygen, sulfur, tertiary nitrogen, boron or phosphorus and, in particular, is cycloalkyl, heterocycloalkyl, cycloalkenyl, heterocycloalkenyl, aryl, heteroaryl, alkaryl, alkylheteroaryl, aralkyl, heteroaralkyl, and the like.

Preferably, M is titanium, zirconium, or hathium, q is 2, and each X is halogen.

Of this preferred group of bridged metallocenes, those in which ligand (Cp$^1$R$^1_m$) is substituted or unsubstituted cyclopentadienyl, ligand (Cp$^2$R$^2_p$) is indenyl or fluorenyl, M is zirconium, R$^4$ and R$^5$ each is substituted or unsubstituted phenyl, and each X ligand is chlorine are still more preferred.

Still other preferred bridged metallocenes (I) that can be used in the polymerization process of this invention include:
diphenylmethylene(indenyl)(fluorenyl)zirconium dichloride;
diphenylmethylene(cyclopentadienyl-9-fluorenyl)zirconium dichloride;
diphenylmethylene(3-methyl-cyclopentadienyl-9-fluorenyl)zirconium dichloride;
diphenylmethylene(3-ethyl-cyclopentadienyl-9-fluorenyl)zirconium dichloride;
diphenylmethylene(3-propyl-cyclopentadienyl-9-fluorenyl)zirconium dichloride;
diphenylmethylene(3-butyl-cyclopentadienyl-9-fluorenyl)zirconium dichloride;
diphenylmethylene(cyclopentadienyl-indenyl)zirconium dichloride;
diphenylmethylene(cyclopentadienyl)(4,5,6,7-tetrahydro-indenyl)zirconium dichloride;
diphenylmethylene(cyclopentadienyl)(2-methylindenyl)zirconium dichloride;
diphenylmethylene(cyclopentadienyl)(2-phenylindenyl)zirconium dichloride;
diphenylmethylene(2,4-dimethylcyclo-pentadienyl)(3',5'-dimethylcyclopentadienyl)zirconium dichloride;
diphenylmethylene(2-methyl-4-tert-butylcyclo-pentadienyl)(3'-tert-butyl-5'-methylcyclopentadienyl)zirconium dichloride;
dixylylmethylene(2,3,5-trimethylcyclopentadienyl)(2',4',5'-trimethylcyclopentadienyl)zirconium dichloride;
dixylylmethylene(2,4-dimethylcyclopentadienyl)(3',5'-dimethylcyclopentadienyl)zirconium dichloride;
dixylylmethylene(2-methyl-4-tert-butylcyclopentadienyl)(3'-tert-butyl-5-methylcyclopentadienyl)zirconium dichloride;
dixylylmethylene(cyclopentadienyl)(fluorenyl)zirconium dichloride;
di-o-tolylmethylene(cyclopentadienyl)(3,4-dimethyl-cyclopentadienyl)zirconium dichloride;
di-o-tolylmethylene(cyclopentadienyl)(3,4-dimethyl-cyclopentadienyl)zirconium dichloride;
di-o-tolylmethylene(cyclopentadienyl)(3,4-dimethylcyclopentadienyl)zirconium dichloride;
di-o-tolylmethylene(cyclopentadienyl)(indenyl)zirconium dichloride;
dibenzylmethylene(cyclopentadienyl)(tetramethylcyclopentadienyl)zirconium dichloride;
dibenzylmethylene(cyclopentadienyl)(indenyl)zirconium dichloride;
dibenzylmethylene(cyclopentadienyl)(fluorenyl)zirconium dichloride;
dicyclohexylmethylene(cyclopentadienyl)(indenyl)zirconium dichloride;
dicyclohexyl(cyclopentadienyl)(fluorenyl)zirconium dichloride;
dicyclohexylmethylene(2-methylcyclopentadienyl)(fluorenyl)zirconium dichloride;
diphenylsilyl(2,4-dimethylcyclopentadienyl)(3',5'-dimethyl-cyclopentadienyl)zirconium dichloride;
diphenylsilyl(2,4-dimethylcyclopentadienyl)(3',5'-dimethyl-cyclopentadienyl)zirconium dichloride;
diphenylsilyl(2,3,5-trimethylcyclopentadienyl)(2,4,5-trimethylcyclopentadienyl)zirconium dichloride;
tetraphenyldisilyl(cyclopentadienyl)(indenyl)zirconium dichloride;
tetraphenyldisilyl(3-mothylcyclopentadienyl)(indenyl)zirconium dichloride;
tetraphenyldisilyl(cyclopentadienyl)(fluorenyl)zirconium dichloride;
di-o-tolylsilyl(cyclopentadienyl)(trimethylcyclopentadienyl)zirconium dichloride;
di-o-tolylsilyl(cyclopentadienyl)(tetramethylcyclopentadienyl)zirconium dichloride;

di-o-tolyisilyl(cyclopentadienyl)(3,4-diethylcyclopentadienyl)zirconium dichloride;
di-o-tolylsilyl(cyclopentadienyl)(triethylcyclopentadienyl)zirconium dichloride;
dibenzylsilyl(cyclopentadienyl)(fluorenyl)zirconium dichloride;
dibenzylsilyl(cyclopentadienyl)(2,7-di-t-butyl-fluorenyl)zirconium dichloride;
dicyclohexylsilyl(cyclopentadienyl)(fluorenyl)zirconium dichloride; and the like.

The cocatalyst, or activator, employed with the preferred bridged metallocene procatalysts of formula (I) can be any of the aluminoxanes known to activate metallocene procatalysts. For further details of the aluminoxane cocatalysts including such alkylaluminoxanes as MAO see, e.g., U.S. Pat. No. 5,229,478. In general, the bridged metallocene procatalyst can be present in the reactor in an amount, expressed in terms of its transition metal content, of from about 0.0001 to about 0.02, preferably from about 0.0002 to about 0.015 and more preferably from about 0.00025 to about 0.01, millimole/liter. Corresponding to these amounts of transition metal, the aluminoxane cocatalyst can be utilized in an amount of from about 0.01 to about 100, preferably from about 0.02 to about 75 and more preferably from about 0.025 to about 50, millimoles/liter. It will, of course, be recognized that optimum levels of bridged metallocene procatalyst and aluminoxane cocatalyst will to some extent depend upon the specific procatalyst and cocatalyst selected, as well as other polymerization process variables.

When employing an aluminoxane cocatalyst, it can be advantageous to include a trialkylaluminum, such as trimethylaluminum, triethylaluminum, tri(n-propyl)aluminum, triisopropyaluminum, tri(n-butyl)aluminum, triisobutyl-aluminum, and the like, to reduce the amount of aluminoxane required for suitable activation of the metallocene procatalyst. In general, the optional trialkylaluminum can be utilized in a molar ratio to metallocene procatalyst of from about 1 to about 1000, preferably from about 2 to about 500.

It is also contemplated that a neutral or anionic metal- and/or metalloid-containing component can optionally be employed with the aluminoxane cocatalyst in activating the metallocene procatalyst.

Useful neutral metal- and/or metalloid-containing components for use herein include boranes such as perfluoro-arylborane compounds, e.g., tris(pentafluorophenyl)borane, tris(methoxyphenyl)borane, tris(trifluoromethylphenyl)borane, tris(3,5-di[trifluoro-methyl]phenyl)borane, tris(tetrafluoroxylyl)borane, tris(tetrafluoro-o-tolyl)borane, etc., and the like. Of the foregoing boranes, tris(pentafluorophenyl)borane and tris(3,5-di[trifluoromethyl]phenyl)borane are preferred. Other useful second components include aluminum homologues of the foregoing compounds.

Suitable anionic metal- and/or metalloid-containing components for use herein include borates such as perfluoroaryl borates, e.g., lithium tetrakis(pentafluorophenyl)borate, lithium tetrakis(trifluoromethylphenyl)borate, lithium tetrakis(3,5-di{tri-fluoromethyl}phenyl)borate, sodium tetrakis(pentafluoro-phenyl)borate, potassium tetrakis(pentafluorophenyl)borate, magnesium tetrakis(pentafluorophenyl)borate, titanium tetrakis(pentafluorophenyl)borate, tin tetrakis(pentafluorophenyl)borate, dimethylanilinium tetrakis(pentafluorophenyl)borate, etc., and the like. Of the foregoing borates, dimethylanilinium tetrakis(pentafluorophenyl)borate and alkali metal borates, such as lithium tetrakis(pentafluorophenyl)borate and lithium tetrakis(3,5-di{trifluoromethyl}phenyl)borate are preferred. Other useful components include aluminate homologues of the foregoing compounds.

In general, the optional neutral or anionic metal- and/or metalloid-containing components can be utilized in a molar ratio to metallocene procatalyst of from about 0.1 to about 10, preferably from about 0.5 to about 3.

Activation of the metallocene can be achieved by combining the aforementioned metallocene procatalysts with the aluminoxane cocatalyst either simultaneously or in any sequence and with any interval of time therebetween and either in the presence or absence of the olefin monomers and hydrogen.

It is particularly advantageous to prepare the activated metallocene catalyst composition in advance and thereafter introduce it into the polymerization reactor with the olefin monomers in the presence of hydrogen. The reaction of the metallocene procatalyst with the aluminoxane cocatalyst is advantageously conducted at a temperature ranging from about 0 to about 50° C. for a time period of from about one minute to about 72 hours.

Copolymerization of the aforementioned monomers using hydrogen and the catalyst can be carried out in any known manner, e.g., in the liquid phase, i.e., in a solution or slurry process, or in a suspension process, either continuously or in batch. These processes are generally carried out at temperatures in the range of from about 0° C. to about 200° C., preferably from about 50° C. to about 150° C., and pressures from about 10 to about 3000 psig. As one skilled in the art would readily appreciate, control of the polymerization temperature has a direct bearing on the quality of the polymerization, e.g., activity, as well as the final product properties, e.g., Iodine Number. However, as these temperatures approach 150° C. or greater, the exothermic temperature, i.e., the maximum temperature reached during the polymerization, should be substantially close to the initial polymerization temperature, e.g., at temperatures above about 150° C. the exothermic temperature should be no more than about 20° C. greater than the initial polymerization temperature.

The polymerization can be carried out in liquid monomer and in the absence of solvent or, if desired, in the presence of solvent. Dilution solvents that can be employed include straight and branched chain hydrocarbons, such as the butanes, the pentanes, the hexanes, the heptanes, the octanes, and the like, cyclic and alicyclic hydrocarbons, such as cyclopentane, cyclohexane, cycloheptane, methylcyclopentane, methylcyclohexane, methylcycloheptane, and the like, and alkyl-substituted aromatic compounds, such as toluene, xylene, and the like, and mixtures of the foregoing.

A typical batch solution polymerization process can be carried out by first introducing the α-olefin, e.g., 1-decene, either alone or in combination with an optional hydrocarbon solvent, e.g., hexanes, xylenes, etc., into a stirred tank reactor. The bulky olefin, e.g., norbornene, can be added either sequentially or simultaneously with the α-olefin. A minor amount of an inert impurity scavenger, e.g., the aforementioned trialkylaluminum compounds, can also be added at this time. The reactor is then brought up to the desired temperature, e.g., from about 0 to about 200° C., preferably from about 20 to about 175° C., and a measured amount of hydrogen can then be introduced into the stirred tank reactor. If copolymetization is desired with a gaseous monomer, a monomer feed comprising, for example, ethylene or 1-propene, is then sparged into the liquid phase, either in combination with, or separate from the hydrogen feed. By carrying out the polymerization reaction in the presence of hydrogen and employing the catalyst herein, a hydrogenation step is eliminated and the liquid poly(α-olefins) of this invention are substantially saturated and, therefore, will possess a low iodine value, e.g., an Iodine Number of from about 0.0 to about 10, preferably from about 0.1 to about 5, and most preferably from about 0.2 to about 3.

Once the desired conditions are established, a hydrocarbon solution of the catalyst in the required amount is then added to the liquid phase in the reactor. The rate of polymerization is controlled by the concentration of the catalyst and monomers present or added during polymerization. The reactor temperature is controlled by means of cooling coils, etc., and the initial total pressure in the reactor is maintained by a constant flow of hydrogen, inert gas, gaseous monomers or a combination thereof. After polymerization is complete, the reactor is depressurized and the catalyst is deactivated by conventional means.

Depending on the amount of monomer conversion and viscosity of the reactor contents, a hydrocarbon solvent can be added to aid in removal the product polyolefin. Spent catalyst components can be isolated from the reaction product via mixing with, e.g., alcohol, water, or a mixture of both, then by phase separation of the hydrocarbyl component from the aqueous component. The liquid polyolefin can then be recovered from the hydrocarbyl component by conventional methods, e.g., evaporation, distillation, etc., and then further processed as desired.

The poly(α-olefin) copolymers that can be obtained by the polymerization process herein are substantially amorphous, i.e., a crystalline phase is substantially absent from the resulting polyolefin as defined by an exothermic peak observation in a differential scanning calorimetry (DSC) experiment. In addition to being substantially amorphous, the poly(α-olefin) copolymers that can be obtained by the polymerization process herein possess a unique combination of low weight average molecular weight ($M_w$), low polydispersity index ($M_w/M_n$, where $M_n$ is number average molecular weight), controllable kinematic viscosity ($Kv_{100}$), high viscosity index (VI), low Iodine Number ($I_2\#$), i.e., a substantially saturated polyolefin, and low glass transition temperature ($T_g$) that distinguish them from known polyolefins. The novel poly(α-olefin) copolymers possess a $M_w$ of from about 500 to about 80,000, preferably from about 750 to about 60,000 and more preferably from about 1,000 to about 40,000, a $M_w/M_n$ of from about 1.0 to about 10, preferably from about 1.5 to about 5, more preferably from about 1.75 to about 4, a $Kv_{100}$ of from about 10 to about 10,000, preferably from about 20 to about 7,500, more preferably from about 25 to about 5,000, an Iodine Number of from about 0.0 to about 10, preferably from about 0.1 to about 5, more preferably from about 0.2 to about 3, and a $T_g$ of below about −20° C., preferably below about −30° C., more preferably below about −40° C.

These advantageous properties can be exploited in a variety of products such as, for example, products which require a viscous oil or an inert material with fluid properties such as dispersants, heat transfer fluids, cosmetics, or other such consumer products, and the like. Additionally, the products of this invention can be used in grafting applications to produce functionalized low molecular weight polymers. The poly(α-olefin) polymers of this invention are particularly useful as viscosity modifiers for lubricants, especially lubricating oils, wherein the polymer is employed in a viscosity-modifying amount. Concentrations of from about 1 to about 99 weight percent based on the total weight of the lubricant composition can be used. Preferably, the concentration is from about 5 to about 85 weight percent.

In general, mineral oils, both paraffinic, naphthenic and mixtures thereof, including those oils defined as American Petroleum Institute Groups I, II, and III can be employed as the lubricant vehicle, and can be any suitable lubricating viscosity range, as, for example, from about 2 cSt at 100° C. to about 1,000 cSt at 100° C., preferably from about 2 to about 100 cSt at 100° C. These oils can have viscosity indices preferably ranging to about 180. The average molecular weights of these oils can range from about 250 to about 800.

Where synthetic oils are employed, they can include, but are not limited to, polyisobutylene, polybutenes, hydrogenated polydecenes, polypropylene glycol, polyethylene glycol, trimethylpropane esters, neopentyl and pentaerythritol esters, di(2-ethylhexyl) sebacate, di(2-ethylhexyl) adipate, dibutyl phthalate, fluorocarbons, silicate esters, silanes, esters of phosphorus-containing acids, liquid ureas, ferrocene derivatives, hydrogenated synthetic oils, chain-type polyphenyls, siloxanes and silicones (polysiloxanes), alkyl-substituted diphenyl ethers typified by a butyl-substituted bis(p-phenoxy phenyl) ether, and phenoxy phenylethers.

The lubricant compositions can also contain one or more other materials, for example, detergents, corrosion inhibitors, oxidative inhibitors, dispersants, pour point dispersants, anti-foaming agents, anti-wear agents, other viscosity modifiers, friction modifiers, and the like at the usual levels in accordance with well known practice. Other materials, including extreme pressure agents, low temperature properties modifiers, and the like, can also be used, as exemplified, respectively, by metallic phenates or sulfonates, polymeric succinimides, non-metallic or metallic phosphorodithioates, and the like, at the usual levels in accordance with well known practice. These materials do not detract from the value of the compositions of this invention, but rather serve to impart their customary properties to the particular compositions in which they are incorporated.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

The examples that follow include those that are illustrative of the invention (Examples 1–14) and those that are outside the scope of this invention (Comparative Examples A1, A2, B, and C). The procatalysts, cocatalyst, solvents, and monomers employed in these examples are as follows:

1. diphenylmethylidene(cyclopentadienyl)-(9-fluorenyl)zirconium dichloride {$Ph_2C(Cp-9-Flu)ZrCl_2$};
2. diphenylmethylidene(3-n-butyl-cyclopentadienyl)-(9-fluorenyl)zirconium dichloride {$Ph_2C(nBuCp-9-Flu)ZrCl2$};
3. diphenylsilyl(cyclopentadienyl)-(9-fluorenyl)zirconium dichloride {$Ph_2Si(Cp-9-Flu)ZrCl_2$};
4. isopropylidene(cyclopentadienyl)-(9-fluorenyl)zirconium dichloride ($Me_2C(Cp-9-Flu)ZrCl_2$};
5. dimethylsilylbis(9-fluorenyl)zirconium dichloride {$Me_2Si(Flu)_2ZrCl_2$};
6. racemic-ethylenebis(1-indenyl)zirconium dichloride {$rac-Et(Ind)_2ZrCl_2$};
7. dimethylsilylbis(cyclopentadienyl)zirconium dichloride {$Me_2Si(Cp)_2ZrCl2$};
8. racemic-dimethylsilylbis(2-methyl-1-indenyl)zirconium dichloride {$rac-Me_2Si(2-MeInd)_2ZrCl_2$};

9. meso-dimethylsilylbis(2-methyl-1-indenyl)zirconium dichloride {meso-Me$_2$Si(2-MeInd)$_2$ZrCl$_2$};
10. dimethylsilyl(tetramethylcyclopentadienyl)(tert-butylamido)titanium dichloride {Me$_2$Si(C$_5$Me$_4$)(ButN)TiCl$_2$};
11. bis(cyclopentadienyl)zirconium dichloride (Cp$_2$ZrCl$_2$);
12. bis(n-butyl-cyclopentadienyl)zirconium dichloride, {(nBuCp)$_2$ZrCl$_2$};
13. methyl aluminoxane (MAO), 10 weight % Al in toluene; and
14. triisobutylaluminum {Al(Bu$^i$)$_3$}, 25 weight % Al in hexanes.

Hexane solvent and olefin monomers (1-hexene, 1-octene, 1-decene, 1-dodecene, and 1-hexadecene) are purified over 3 Å molecular sieves and activated silica/alumina. Anhydrous grade toluene solvent is used as received from Aldrich Chemical Co. (Milwaukee, Wis.) and stored over dry, deoxygenated nitrogen or argon. Methyl aluminoxane (MAO), 10 weight % Al in toluene, and triisobutylaluminum (TIBAl), 25 weight % Al in hexanes, are used as received from Crompton Corporation (Bergkamen, Germany). 2-Norbornene is used as received from Aldrich Chemical Co. (Milwaukee, Wis.).

Unless indicated otherwise, all polymerizations were performed in a jacketed 3 liter Büchi autoclave reactor equipped with a magnetically coupled agitator, a thermocouple, and various inlets. The autoclave was flushed with nitrogen or argon and anhydrous hexane prior to use, then filled with monomers and, optionally, with an inert diluent. TIBAl was used optionally as an impurity scavenger, then the reactor was brought up to the desired pressure and temperature prior to addition of the catalyst components. Polymerization was started upon addition of catalystcomponents. If desired, reactor pressure was maintained by addition of argon, nitrogen, and/or hydrogen. The polymerization was terminated by depressurization of the autoclave, then transfer of the reactor contents into an agitated vessel containing a mixture of isopropanol and water acidified with 1% HCl. Periodically, hexane was used to help facilitate removal of higher viscosity products from the reactor and into the wash vessel.

The following procedures were used to determine the properties of the liquid polyolefins.

Kinematic Viscosity (Kv) and Viscosity Index (VI)

The kinematic viscosity (Kv) of the liquid polyolefins, Kv, was measured using a modified Ostwald viscometer according to ASTM standard D445 and reported at temperatures of 100° C. (Kv at 100° C.) or 40° C. (Kv at 40° C.). The viscosity index (VI) was measured according to ASTM standard D2270 using the measured kinematic viscosities for each polyolefin.

Weight Average Molecular Weight ($M_w$), Number Average Molecular Weight ($M_n$), and ($M_w/M_n$)

The molecular weights of the polyolefins, $M_w$ and $M_n$, were measured in tetrahydrofuran at 35° C. on a Waters GPC II gel permeation chromatograph equipped with a Waters RA401 refractive index detector and 5 Waters Styragel HT columns (HT6, HT5, HT4, HT3, and HT2). The flow rate was 1 mL/min., and the concentration was 0.25%. Molecular weights were calculated from elution times calibrated against polystyrene standards from American Polymer Standards Corp. (ranging for 162 molecular weight to 600,000 molecular weight) using a quadratic fit.

Glass Transition Temperature ($T_g$)

The glass transition temperatures of liquid polyolefins ($T_g$) were measured by differential scanning calorimetry upon 20–25 mg of polymer without molding. $T_g$ is reported as the midpoint of the glass transition on the heating curve of the sample, recorded on a Perkin Elmer DSC 7 differential scanning calorimeter (from –100° C. to 180° C. at a heating rate of 20° C./minute). Calibration was performed with both indium and octane standards.

Branching Ratio and Relative Unsaturation

The branch content of the liquid polyolefins was determined by infrared spectroscopy of thin polymer films on a Perkin-Elmer infrared spectrophotometer model Paragon 1000 PC, by comparison of the relative intensities of methyl to methylene groups in the polymer. This method closely parallels measurements from ASTM standard D3900, which determines the relative ethylene to propylene ratio in EP copolymers. Relative unsaturation in the polymer was qualitatively determined via analysis of the region from 800–1100 cm$^{-1}$ and 1600–1700 cm$^{-1}$ of the same polymer film.

Unsaturation Determination by Iodine Number

The amount of unsaturation in the liquid polyolefins was determined by measurement of the Iodine Number (I$_2$ #) which is defined as the number of grams of iodine that add to 100 grams of sample. Only halogen that combines with a sample by way of addition to double bonds is a true measurement of unsaturation. Substitution reactions and, to a lesser extent, splitting-out reactions contribute to some error in the determination. In this method, the slow rate of addition of iodine to double bonds is catalyzed by mercuric acetate allowing the reaction to be completed in about one hour where the effects of the slower substitution and splitting-out reactions are minimized. The method was adapted from Gallo et al., "Unsaturation in Isoprene-Isobutylene Copolymers", Industrial and Engineering Chemistry, Vol. 40, (1948) pp. 1277–1280.

Polymer Analysis by NMR Spectroscopy

Experiment

NMR spectroscopy was performed on a Varian Mercury-300. $^1$H and $^{13}$C NMR spectra were acquired at room temperature. For $^1$H spectra, the relaxation time was 1.00 s, and acquisition time was 2.67 s. The total number of scans was 96. For $^{13}$C spectrum, relaxation time was 1.63 s, and acquisition time was 0.87 s. The total number of scans was 2,048. Samples (15 mg for $^1$H and 200 mg for $^{13}$C) were dissolved in 0.6 mL CDCl$_3$ in a glass vial at room temperature with sufficient stirring to ensure homogeneity. The solution was transferred into a 5-mm NMR tube for spectrum acquisition. Determinations performed from these data included proton and carbon chemical shift assignments for all major peaks found, detection of relative unsaturation in polymer, and determination of norbornene content in polymer.

Norbornene Content (Mole Percent) Calculation

Assuming A is the total peak area from 1.8 to 2.3 ppm in a $^1$H spectrum, due to 6 H in norbornene: of which 2 H attached to the carbons connecting to the polymer chain, 2 H on the bridge, 2 H attached to the carbons at the bridge ends; assuming B is the total peak area from 0.5 to 1.6 ppm, due to all other saturated H in the polymer, norbornene mole content (mole percent NB) was calculated based on the following equation (peak area due to impurity in the solvent was subtracted):

$$\text{mole \% } NB = \frac{A/6}{(B - A \times 4/6)/20 + A/6} \times 100$$

Example 1

A dried three-liter Büchi reactor was filled under argon with 1,250 mL of dry 1-decene monomer and 31 grams (5 mol percent) of 2-norbornene. The reactor temperature was brought up to 100° C. with agitation, then hydrogen was added to bring the reactor pressure to 200 psig. Then, a solution of 0.012 grams of $Ph_2C(Cp-9-Flu)ZrCl_2$ dissolved in 15 mL of a 10 weight percent solution of MAO in toluene, which had been prepared 30 minutes prior to use, was injected into the stirred reactor with a slight overpressure of argon. The reactor was maintained at a pressure of 200 psig via addition of hydrogen on demand, and a temperature of 100° C. was maintained for a period of 30 minutes. When complete, the reactor was depressurized and the reactor temperature controller was set to 20° C. The reactor contents were then pressure transferred to a vessel equipped with an agitator containing 50 mL of acidified isopropariol in 400 mL of water and agitated for two minutes. A white flocculent material presumed to be an aluminum alkoxide precipitated and settled in the aqueous phase. The mixture was allowed to settle, and then the organic layer was removed from the aluminum residue-laden aqueous layer. The remaining organic solution was then filtered to remove any particulate matter, then residual monomer and volatiles were removed by evaporation under reduced pressure in a rotary evaporator. A quantity of 677.5 grams of a clear, colorless liquid polyolefin material was obtained. GPC analysis gave a molecular weight of 4,618, a $M_n$ of 2,256, and a polydispersity, $M_w/M_n$, of 2.00. DSC analysis gave a $T_g$ of $-71.8°$ C., with no indication of crystallinity. Kinematic viscosity measurements at 100° C. and 40° C. showed values of 85 and 850 cSt, respectively. The viscosity index was calculated at 186. Unsaturation as measured by Iodine Number was 1.50.

$^1H$ and $^{13}C$ NMR analysis performed on this material indicated that there was little to no detectable unsaturation in the polymer. Comparison of the integration of the unsaturated versus the saturated regions in $^1H$ NMR showed that less than 0.06 percent of the hydrogens present in the sample were vinylic in nature. By a similar comparison of integrated regions, it was determined that the liquid polymer had incorporated 1.87 mol percent of norbornene.

Example 2

A dried three-liter Buichi reactor was filled under argon with 1,250 mL of dry 1-decene monomer and 23 grams of 2-norbornene. The reactor temperature was brought up to 120° C. with agitation, then hydrogen was added to bring the reactor pressure to 200 psig. Then, a solution of 0.007 gram of $Ph_2C(nBuCp-9-Flu)ZrCl_2$ dissolved in eight mL of a ten weight percent solution of MAO in toluene, which had been prepared 30 minutes prior to use, was injected into the stirred reactor with a slight overpressure of argon. The reactor was maintained at a pressure of 200 psig via addition of hydrogen on demand, and a temperature of 120° C. was maintained for a period of 30 minutes. When complete, the reactor was depressurized and the reactor temperature controller was set to 20° C. The reactor contents were then pressure transferred to a vessel equipped with an agitator containing 50 mL of acidified isopropanol in 400 mL of water and agitated for two minutes. A white flocculent material presumed to be aluminum alkoxide precipitated and settled in the aqueous phase. The mixture was allowed to settle, and then the organic layer was removed from the aluminum residue-laden aqueous layer.

The remaining organic solution was then filtered to remove any particulate matter, then residual monomer and volatiles were removed by evaporation under reduced pressure in a rotary evaporator. A quantity of 481.5 grams of a clear, colorless liquid polyolefin material was obtained. GPC analysis performed gave a molecular weight of 3,672, a $M_n$ of 2,020, and a polydispersity $M_w/M_n$ of 1.80. DSC analysis gave a $T_g$ of $-73.9°$ C., with no indication of crystallinity. Kinematic viscosity measurements at 100° C. and 40° C. showed values of 57 and 481 cSt, respectively. The viscosity index was calculated at 187. Unsaturation as measured by Iodine Number was 2.25. $^1H$ and $^{13}C$ NMR analysis performed on this material indicated that there was little to no detectable unsaturation in the polymer. Comparison of the integration of the unsaturated versus the saturated regions in $^1H$ NMR showed that less than 0.05 percent of the hydrogens present in the sample were vinylic in nature. By a similar comparison of integrated regions, it was determined that the liquid polymer had incorporated 2.08 mol percent of norbornene.

Example 3

A dried three-liter Büchi reactor was filled under argon with 1,257 mL of dry 1-decene monomer and 12.8 grams of 2-norbornene. The reactor temperature was brought up to 40° C. with agitation. Hydrogen was then added to bring the reactor pressure to 200 psig. Then, a solution of 0.012 grams of $rac$-$Et(Ind)_2ZrCl_2$ dissolved in 20 mL of a 10 weight percent solution of MAO in toluene, which had been prepared 30 minutes prior to use, was injected into the stirred reactor with a slight overpressure of argon. The reactor was maintained at a pressure of 200 psig via addition of hydrogen on demand, and a temperature of 40° C. was maintained for a period of 30 minutes. When complete, the reactor was depressurized and the reactor temperature controller was set to 20° C. The reactor contents were then pressure transferred to a vessel equipped with an agitator containing 50 mL of acidified isopropanol in 400 mL of water, and agitated for two minutes. A white flocculent material presumed to be an aluminum alkoxide precipitated and settled in the aqueous phase. The mixture was allowed to settle. The organic layer was then removed from the aluminum residue-laden aqueous layer.

The remaining organic solution was then filtered to remove any particulate matter. Residual monomer and volatiles were then removed by evaporation under reduced pressure in a rotary evaporator. A quantity of 181.3 grams of a clear, colorless liquid polyolefin material was obtained. GPC analysis performed gave a molecular weight of 3,384, an $M_n$ of 1,811, and a polydispersity $M_w/M_n$ of 1.9. DSC analysis gave a $T_g$ of $-72.8°$ C. and a $T_m$ of $-2.7°$ C. Kinematic viscosity measurements at 100° C. and 40° C.

showed values of 54 and 470 cSt, respectively. The viscosity index was calculated at 180. Unsaturation as measured by Iodine Number was 0.7.

The presence of a $T_m$ makes the material made in Example 3 unsuitable for lubrication applications in spite of its low degree of unsaturation.

Comparative Example A1

The procedure of Example 1 was repeated using only 1-decene as the monomer, with no cycloolefin present. Thus, 0.012 gram of catalyst and 15 mL of MAO were used to polymerize 1,250 mL of 1-decene at a temperature of 100° C. for 30 minutes and with hydrogen on demand at 200 psi reactor pressure to produce 527.8 grams of a clear, colorless liquid polyolefin. GPC analysis gave a molecular weight of 16,011, a $M_n$ of 6,666, and a polydispersity $M_w/M_n$ of 2.4. DSC analysis gave a $T_g$ of −68.9° C., with no indication of crystallinity. Kinematic viscosity measurements at 100° C. and 40° C. showed values of 502 and 5,520 cSt, respectively. The viscosity index was calculated at 272. Unsaturation as measured by Iodine Number was 1.35. $^1$H and $^{13}$C NMR analysis performed on this material indicated that there was little to no detectable unsaturation in the polymer. Comparison of the integration of the unsaturated versus the saturated regions in $^1$H NMR showed that less than 0.03 percent of the hydrogens present in the sample were vinylic in nature.

This comparative example clearly shows that the addition of cycloolefin to the polymerization of 1-decene aids in the suppression of molecular weight and, in turn, viscosity, under relatively mild conditions.

Comparative Example A2

The procedure of Comparative Example A1 modified to obtain a liquid homopolymer of comparable viscosity to that of Example 1 by raising the polymerization temperature. Thus, 0.007 gram of catalyst and 8.8 mL of MAO were used to polymerize 750 mL of 1-decene at a temperature of 170° C. for 30 minutes and with hydrogen on demand at 240 psi to produce 372.4 grams of a liquid polyolefin. Kinematic viscosity measurements at 100° C. and 40° C. showed values of 73 and 599 cSt, respectively. The viscosity index was calculated at 202. Unsaturation as measured by Iodine Number was 7.45. This unsaturation value is significantly higher than that of Example 1, a liquid polyolefin of comparable viscosity.

Comparative Example B

The procedure of example 2 was repeated using only 1-decene as the monomer, with no cycloolefin present, and under conditions to produce a polymer of viscosity similar to Example 2. Thus, 0.008 gram of catalyst and 4.5 mL of MAO were used to polymerize 750 mL of 1-decene at a temperature of 150° C. for 30 minutes and with hydrogen on demand at 230 psi to produce 372.4 grams of a liquid polyolefin. Kinematic viscosity measurements at 100° C. and 40° C. showed values of 68 and 534 cSt, respectively. The viscosity index was calculated at 205. Unsadturation as measured by Iodine Number was 8.15. This unsaturation value is significantly higher than that of Example 2.

Comparative Example C

The procedure of Example 1 was repeated with argon at 200 psig replacing the hydrogen. A quantity of 49.8 grams of a liquid polyolefin was produced. The kinematic viscosity at 100° C. was 376 cSk and the unsaturation as measured by iodine number was 13.0. Thus, in the absence of a hydrogen atmosphere, the copolymerization produces a low yield of a polymer having higher than desired viscosity and unsaturation.

Comparative Example D

The procedure of Example 3 was repeated using only 1-decene as the monomer, with no cycloolefin present, and under conditions to produce a polymer of viscosity similar to Example 3. Thus, 0.021 gram of catalyst and 35 mL of MAO were used to polymerize 750 mL of 1-decene at a temperature of 40° C. for 30 minutes and with hydrogen on demand at 200 psi to produce 462.5 grams of a liquid polyolefin. Kinematic viscosity measurements at 100° C. and 40° C. showed values of 54 and 380 cSt, respectively. The viscosity index was calculated at 209. Unsaturation as measured by Iodine Number was 19.55. This unsaturation value is significantly higher than that of Example 3.

Example 4–8

The procedure of Example 1 was repeated using varying amounts of 2-norbornene in the reactor to give a representative range of 1 to 15 mol percent of comonomer. All other conditions remained the same as in Example 1. Following polymerization and workup of the reactor contents, samples were analyzed for yield, amount of norbornene incorporated (via $^1$H NMR analysis), Iodine Number ($I_2$#), viscosity, molecular weight by GPC, and glass transition temperature (DSC):

| Example | mol % NB | Yield, g | mol % NB incorp. | $I_2$# | $Kv_{100}$ | VI | $M_n$ | MWD | $T_g$, ° C. |
|---|---|---|---|---|---|---|---|---|---|
| A1 | 0 | 527.8 | 0 | 1.35 | 502 | 272 | 6,666 | 2.4 | −68.9 |
| 4 | 1 | 461.1 | 0.4 | 1.50 | 233 | 232 | 4,273 | 2.2 | −69.4 |
| 5 | 2 | 781.0 | 0.9 | 1.95 | 166 | 217 | 3,664 | 2.0 | −68.5 |
| 1 | 5 | 677.5 | 1.87 | 1.50 | 85.0 | 186 | 2,256 | 2.0 | −71.8 |
| 6 | 8 | 527.0 | 3.70 | 2.30 | 40.4 | 162 | 1,571 | 1.9 | −77.1 |
| 7 | 10 | 685.9 | 5.3 | 2.20 | 36.1 | 142 | 1,494 | 2.0 | −75.7 |
| 8 | 15 | 482.5 | 7.0 | 2.80 | 21.7 | 146 | 1,023 | 1.7 | −77.7 |

The table demonstrates that increasing levels of 2-norbornene under otherwise identical conditions are able to depress the molecular weight of the polymer to a wide range of viscosities suitable for use in lubricant formulations without adversely impacting the level of catalyst activity, unsaturation, polydispersity, or low temperature behavior.

Example 9–11

The procedure of Example 5, with 2 mol percent norbornene in the reactor, was repeated for this series, which looks at a representative range of polymerization temperatures, all other conditions being identical. Following polymerization and workup of the reactor contents, samples were analyzed for yield, viscosity, and Iodine number ($I_2\#$):

| Example | mol % NB | Polym. Temp., C. | Yield, g | $I_2\#$ | $Kv_{100}$ | VI |
|---|---|---|---|---|---|---|
| 5 | 2 | 100 | 781.0 | 1.95 | 166 | 217 |
| 9 | 2 | 124 | 819.3 | 2.6 | 120 | 183 |
| 10 | 2 | 136 | 828.6 | 3.1 | 124 | 231 |
| 11 | 2 | 148 | 819.3 | 4.3 | 86 | 196 |

Example 12

A dried three-liter Büchi reactor was filled under argon with 1,250 mL of dry 1-decene monomer and 12.5 grams (2 mol percent) of 2-norbornene. The reactor temperature was brought up to 90° C. with agitation. Hydrogen was then added to bring the reactor pressure to 200 psig. Then, a solution of 0.012 gram of iPr(Cp-9-Flu)ZrCl$_2$ dissolved in 19 mL of a 10 weight percent solution of MAO in toluene, which had been prepared 30 minutes prior to use, was injected into the stirred reactor with a slight overpressure of argon. The reactor was maintained at a pressure of 200 psig via addition of hydrogen on demand, and a temperature of 90° C. was maintained for a period of 30 minutes. When complete, the reactor was depressurized and the reactor temperature controller was set to 20° C. The reactor contents were then pressure transferred to a vessel equipped with an agitator containing 50 mL of acidified isopropanol in 400 mL of water, and agitated for two minutes, The mixture was allowed to settle. The organic layer was then removed from the aluminum residue-laden aqueous layer.

The remaining organic solution was then filtered to remove any particulate matter. Residual monomer and volatiles were then removed by evaporation under reduced pressure in a rotary evaporator. A quantity of 56.3 grams of a clear, colorless liquid polyolefin material was obtained. Kinematic viscosity measurements at 100° C. showed a value of 3.02 cSt. Unsaturation as measured by Iodine Number was 1.50.

Example 13

A dried three-liter Büchi reactor was filled under argon with 1,250 mL of dry 1-decene monomer and 12.5 grams (2 mol percent) of 2-norbornene. The reactor temperature was brought up to 90° C. with agitation. Hydrogen was then added to bring the reactor pressure to 200 psig. Then, a solution of 0.012 gram of Me$_2$Si(Flu)$_2$ZrCl$_2$ dissolved in 19 mL of a 10 weight percent solution of MAO in toluene, which had been prepared 30 minutes prior to use, was injected into the stirred reactor with a slight overpressure of argon. The reactor was maintained at a pressure of 200 psig via addition of hydrogen on demand, and a temperature of 90° C. was maintained for a period of 30 minutes. When complete, the reactor was depressurized and the reactor temperature controller was set to 20° C. The reactor contents were then pressure transferred to a vessel equipped with an agitator containing 50 mL of acidified isopropanol in 400 mL of water, and agitated for two minutes. A white flocculent material presumed to be an aluminum alkoxide precipitated and settled in the aqueous phase. The mixture was allowed to settle. The organic layer was then removed from the aluminum residue-laden aqueous layer.

The remaining organic solution was then filtered to remove any particulate matter. Residual monomer and volatiles were then removed by evaporation under reduced pressure in a rotary evaporator. Only trace polymeric material was obtained.

Example 14

A dried three-liter Büchi reactor was filled under argon with 1,250 ML of dry 1-decene monomer and 31 grams (5 mol percent) of 2-norbornene. The reactor temperature was brought up to 90° C. with agitation, then hydrogen was added to bring the reactor pressure to 200 psig. Then, a solution of 0.012 gram of Ph$_2$Si(Cp-9-Flu)ZrCl$_2$ dissolved in 14.4 mL of a 10 weight percent solution of MAO in toluene, which had been prepared 30 minutes prior to use, was injected into the stirred reactor with a slight overpressure of argon. The reactor was maintained at a pressure of 200 psig via addition of hydrogen on demand, and a temperature of 90° C. was maintained for a period of 30 minutes. When complete, the reactor was depressurized and the reactor temperature controller was set to 20° C. The reactor contents were then pressure transferred to a vessel equipped with an agitator containing 50 mL of acidified isopropanol in 400 mL of water and agitated for two minutes. A white flocculent material presumed to be an aluminum alkoxide precipitated and settled in the aqueous phase. The mixture was allowed to settle. The organic layer was then removed from the aluminum residue-laden aqueous layer. The remaining organic solution was then filtered to remove any particulate matter. Then, residual monomer and volatiles were removed by evaporation under reduced pressure in a rotary evaporator. A quantity of 19.4 grams of a clear, colorless liquid polyolefin material was obtained. Kinematic viscosity measurements at 100° C. showed a value of 6.11 cSt. Unsaturation as measured by Iodine Number was 19.4.

Example 15

A dried three-liter Büchi reactor was filled under argon with 1,250 mL of dry 1-decene monomer and 31 grams (5 mol percent) of 2-norbornene. The reactor temperature was brought up to 90° C. with agitation. Hydrogen was then added to bring the reactor pressure to 200 psig. Then, a solution of 0.012 gram of rac-Me$_2$Si(2-MeInd)$_2$ZrCl$_2$ dissolved in 17.4 mL of a 10 weight percent solution of MAO in toluene, which had been prepared 30 minutes prior to use, was injected into the stirred reactor with a slight overpressure of argon. The reactor was maintained at a pressure of 200 psig via addition of hydrogen on demand, and a temperature of 90° C. was maintained for a period of 30 minutes. When complete, the reactor was depressurized and the reactor temperature controller was set to 20° C. The reactor contents were then pressure transferred to a vessel equipped with an agitator containing 50 mL of acidified isopropanol in 400 mL water and agitated for two minutes. A white flocculent material presumed to be an aluminum alkoxide precipitated and settled in the aqueous phase. The mixture was allowed to settle. The organic layer was then removed from the aluminum residue-laden aqueous layer.

The remaining organic solution was then filtered to remove any particulate matter. Residual monomer and volatiles were then removed by evaporation under reduced pressure in a rotary evaporator. A quantity of 67.8 grams of a clear, colorless liquid polyolefin material was obtained. Kinematic viscosity measurements at 100° C. showed a value of 22.6 cSt. Unsaturation as measured by Iodine Number was 2.7.

In view of the many changes and modifications that can be made without departing from principles underlying the invention, reference should be made to the appended claims for an understanding of the scope of the protection to be afforded the invention.

What is claimed is:

1. A lubricant composition comprising a lubricant and a viscosity-modifyng amount of a poly(α-olefin) copolymer obtained from the polymerization of at least one α-olefin having from 2 to about 20 carbon atoms and at least one bulky olefin, the process comprising polymerizing the monomers in the presence of hydrogen and a catalytically effective amount of a catalyst comprising the product obtained by combining a metallocene procatalyst with a cocatalyst, the metallocene procatalyst being at least one compound of general formula:

$(Cp^1R^1_m)R^3(Cp^2R^2_p)MX_q$ wherein $Cp^1$ of ligand $(Cp^1R^1_m)$ and $Cp^2$ of ligand $(Cp^2R^2_p)$ are the same or different cyclopentadienyl rings, $R^1$ and $R^2$ each is, independently, hydrogen or a hydrocarbyl, halocarbyl, hydrocarbyl-substituted organometalloid or halocarbyl-substituted organometalloid group containing up to about 20 carbon atoms, m is 0 to 5, p is 0 to 5 and two $R^1$ and/or $R^2$ substituents on adjacent carbon atoms of the cyclopentadienyl ring associated therewith can be joined together to form a ring fused to the cyclopentadienyl ring, the fused ring containing from 4 to about 20 carbon atoms, $R^3$ is a bridging group bridging $Cp^1$ and $Cp^2$, M is a transition metal having a valence of from 3 to 6, each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2, the cocatalyst being an aluminoxane and it being provided that ligand $(Cp^1R^1_m)$ is different from ligand $(Cp^2R^2_p)$ and bridging group $R^3$ contains at least two bulky groups; wherein the poly(α-olefin) possesses a $M_w$ of from about 500 to about 80,000, a $M_w/M_n$ of from about 1.0 to about 10, a $KV_{100}$ of from about 10 to about 10,000, an Iodine Number of from about 0.0 to about 10 and a $T_g$ of below about −20° C. and wherein the poly(α-olefin) is substantially amorphous.

2. The lubricant composition of claim 1 wherein in the metallocene procatalyst, ligand $(Cp^1R_m^1)$ is unsubstituted cyclopentadienyl, ligand $(Cp^2R_p^2)$ is substituted or unsubstituted indenyl or fluorenyl, $M^1$ is zirconium, $R^4$ and $R^5$ each is phenyl and each ligand X is chlorine.

3. The lubricant composition of claim 1 wherein the bulky olefin is selected from the group consisting of cyclic and polycyclic olefins of the structural formulae:

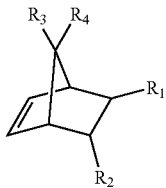

I

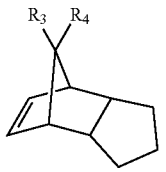

II

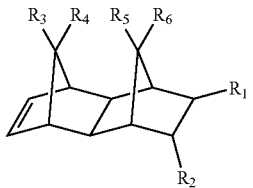

III

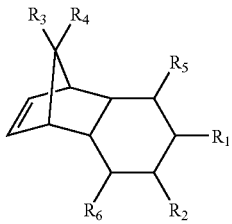

V

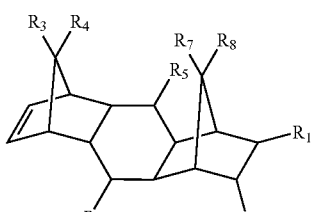

VI

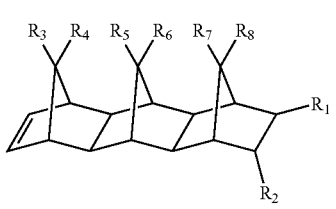

IV wherein $R_1$, $R_2$, $R_3$, $R_4$, $R_5$, $R_6$, $R_7$, and $R_8$ are identical or different and are selected from the group consisting of hydrogen, $C_6$–$C_{16}$ aryl moieties, and $C_1$–$C_8$ alkyl moieties, it being possible for identical radicals in the different formulae to have different meanings.

4. The lubricant composition of claim 1 wherein the α-olefin is 1-decene and the bulky olefin is norbornene.

5. The lubricant composition of claim 1 wherein polymerization is carried out under slurry polymerization conditions.

6. The lubricant composition of claim 1 wherein the poly(α-olefin) possesses a $M_w$ of from about 750 to about 60,000, a $M_w/M_n$ of from about 1.5 to about 5, a $KV_{100}$ of from about 20 to about 7,500, an Iodine Number of from about 0.1 to about 5 and a $T_g$ of below about −30° C.

* * * * *